United States Patent
Matuschka et al.

[11] Patent Number: 5,960,822
[45] Date of Patent: Oct. 5, 1999

[54] STEP VALVE

[75] Inventors: Joachim Matuschka, Emskirchen; Jörg Weber, Forchheim; Dieter Adler, Herzogenaurach, all of Germany

[73] Assignee: INA Wäzlager Schaeffler OHG, Herzogenaurach, Germany

[21] Appl. No.: 08/973,027

[22] PCT Filed: Jun. 29, 1996

[86] PCT No.: PCT/EP96/02855

§ 371 Date: Dec. 3, 1997

§ 102(e) Date: Dec. 3, 1997

[87] PCT Pub. No.: WO97/04258

PCT Pub. Date: Feb. 6, 1997

[30] Foreign Application Priority Data

Jul. 17, 1995 [DE] Germany ................ 195 25 948

[51] Int. Cl.[6] ............... F16K 17/26; F16K 15/00
[52] U.S. Cl. ............ 137/493.8; 137/539; 137/540; 137/515.7
[58] Field of Search ............... 137/493.8, 539, 137/538, 540, 515.7

[56] References Cited

U.S. PATENT DOCUMENTS

| | | | |
|---|---|---|---|
| 1,351,906 | 9/1920 | Heeter | 137/533.19 |
| 2,351,874 | 6/1944 | Parker | 137/493.8 |
| 2,643,090 | 6/1953 | Cluphf | 137/533.19 |
| 2,723,679 | 11/1955 | Harris et al. | 137/533.19 |
| 3,016,913 | 1/1962 | Bargmann | 137/543.19 |
| 3,017,897 | 1/1962 | Seguenot | 137/538 |
| 3,901,475 | 8/1975 | Dreibelbis | 137/539 |
| 3,917,422 | 11/1975 | Betzler . | |
| 4,337,873 | 7/1982 | Johnson | 137/493.8 |
| 4,365,648 | 12/1982 | Grothe | 137/539 |
| 5,054,511 | 10/1991 | Tuan et al. | 137/493.8 |

FOREIGN PATENT DOCUMENTS

| | | | |
|---|---|---|---|
| 214597 | 4/1956 | Australia | 137/493.8 |
| 1038587 | 3/1951 | France | 137/493.8 |
| 1207358 | 11/1958 | France | 137/493.8 |
| 1382117 | 11/1964 | France | 137/493.8 |
| 0268520 | 5/1988 | France | 137/493.8 |
| 702425 | 1/1941 | Germany | 137/539 |
| 835969 | 3/1950 | Germany | 137/493.8 |
| AS 1 160 693 | 1/1964 | Germany . | |
| 2028383 | 5/1971 | Germany | 137/493.8 |
| 97 283 | 4/1972 | Germany . | |
| GM 7213157 | 7/1972 | Germany . | |
| GM 7239880 | 7/1974 | Germany . | |
| 26 39 819 | 3/1977 | Germany . | |
| 27 28 486 A1 | 1/1979 | Germany . | |
| 3840182 A1 | 5/1980 | Germany . | |
| 3720281 A1 | 1/1989 | Germany . | |
| 4428074 A1 | 10/1995 | Germany . | |
| 467160 | 11/1951 | Italy | 137/493.8 |
| 46-8069 | 3/1971 | Japan | 137/493.8 |
| 810836 | 3/1959 | United Kingdom | 137/493.8 |
| 878 019 | 9/1961 | United Kingdom . | |
| 1 408 435 | 10/1975 | United Kingdom . | |
| 2 032 581 | 5/1980 | United Kingdom . | |

OTHER PUBLICATIONS

Search Report from International Application No. PCT/EP96/02855.

Search Report from Priority Application DE 195 25 948.3 dated May 9, 1996.

*Primary Examiner*—Henry Bennett
*Assistant Examiner*—Joanne Y. Kim
*Attorney, Agent, or Firm*—Panitch, Schwarze, Jacobs & Nadel, P.C.

[57] ABSTRACT

The invention concerns a valve arrangement installed in a hydraulic system including a housing (17a, 17b) which is provided with two connections (22, 23) and includes a closing element (14) which lies in a neutral position on a valve seat (6). In accordance with the invention, a valve element (11) is provided which has two step valves (15a, 15b), arranged at a distance, each being associated with one flow direction, whose the closing elements (14) are acted upon by a spring force.

20 Claims, 5 Drawing Sheets

STEP VALVE

BACKGROUND OF THE INVENTION

The invention relates to a valve arrangement of a hydraulic system, constructed as a step valve, including a housing which is provided with two pressure connections and has at least one valve seat to which a closing element is allocated which, in a closed position, has a first valve surface which is smaller than a second valve surface, which it has in a position where the closing element is displaced from the valve seat.

The use of one way valve, also called a non-return value or relief valve, is known in hydraulic systems to make a pressure medium flow possible and to block a return flow. Known valves of this type have a spring actuated closing element which lies sealingly against the sealing seat of the one way valve in its closed position. The construction of the valve requires that the opening pressure substantially depends upon the initial stressing force of the spring and the valve surface acted upon by pressure fluid. In this way, an increasing pressure flow resistance appears with the rise in the flow volume. This property is disadvantageous for a number of applications.

From DE-A 27 28 486 a type of valve arrangement is known in which a closing element lies sealing on a housing-side valve seat in the closed position. The pressurized fluid flows toward the closing element via an entrance in the housing and acts upon a valve surface which is smaller than a second valve surface which appears after the pressurized fluid displaces the closing element from the valve seat. The second valve surface at the same time corresponds to the diameter of the spherical closing element, whereby immediately after lifting the closing element from the valve seat, the flow-through cross section is not yet set up, because the closing element must be guided through a stepped section of a step boring having a diameter which is only slightly larger than the diameter of the closing element. After a further displacement of the closing element in a next larger section of the step boring, a new flow-through cross section is set up. The familiar one way valve makes possible an uncontrolled shifting of the closing element in the open position, whereby this can knock against the housing, which leads to a disadvantageous development of noise.

SUMMARY OF THE INVENTION

The object of the present invention is to minimize the flow-through resistance for a valve arrangement which is acted upon by pressure fluid in two flow directions, whereby its construction makes an effective reduction of noise possible.

The object is accomplished by the features mentioned in the characterization part of the first claim.

The accomplishment of the objective consists of arranging two step valves in a valve element at a distance from each other, each associated with one direction of flow, which are correspondingly provided with a valve seat and a spring actuated closing element. The inventive valve element used in a valve arrangement (which, for example, can be used in connection with a hydraulic circulation having changing flow directions), possesses an advantageous degressive opening characteristic of the closing element. This is achieved, since after opening the closing element, the flow resistance diminishes in comparison to a closed closing element owing to a larger surface acted upon on the closing element. In addition to the different surfaces of the closing element which are acted upon by pressure fluid between the closed and the open state, a relatively weak spring which displaces the closing element in the direction of the valve seat brings about a desired reduction of the flow resistance of the valve element.

Based on this configuration, a higher pressure is necessary for opening the step valve in comparison with the opened step valve. This mode of operation is useful for compensating for pressure pulsations in hydraulic systems through which, for example, pressure fluctuations occurring very frequently do not lead to a disadvantageous unwanted opening of the valve. The invention brings it about that the change in the hydraulically effective surface or in the loss of pressure on the step valve can be purposefully adjusted as a function of the flow volume. Advantageously, the pedal feel on the clutch pedal can be improved by using the step valve in a hydraulically actuated clutch in a motor vehicle.

In an advantageous configuration of the invention, the valve arrangement comprises two valve seats arranged radially at a distance in a valve disk, one valve seat being associated with each direction of flow, to which a closing element is allocated in each case. This compact step valve arrangement associated with both flow directions makes a digressive opening possible for both flow directions. Based on the layout, which is optimized as to construction space, a step valve constructed in this manner can, for example, be combined with other components of a hydraulic system.

The design of the compression springs, which are arranged with each closing body, is provided such that between the open and closed state of the closing body there are nearly equal spring forces appear.

For this, a relatively weakly constructed spring is used, which, in connection with the various valve surfaces on the closing element, supports the desired degressive opening characteristic of the step valve.

It is appropriate to use a rotation symmetrically configured component as a closing element. A closing element in the form of a ball is especially suitable for this. Furthermore, closing elements configured as thrust washers can likewise be used which have a diameter gradation which is adapted to the diameter gradation of the valve seat. As a further alternative, a rotationally symmetrical closing element having a cylindrical construction form can also be used which is configured conically on both faces, forming a truncated cone. For reducing the mass, the cylindrically shaped closing element may be constructed as a hollow element.

For assuring or intensifying the digressive opening characteristic, it is expedient for the larger valve surface to correspond to one, 1.2 to 5 times the value of the valve surface which in the closed step valve is acted upon by pressure medium.

In a further advantageous configuration of the invention, the valve disk has guide elements for guiding the closing element, which also provide the closing element with a radial guidance in the opened state. This way, a disadvantageous noise excitation can be effectively prevented which occurs in connection with previous one way valves or step valves in which the closing element strikes on the housing wall in an uncontrolled manner. At the same time, the radial guide for the closing element can be constructed in multiple configurations. Preferably, for example, rods or pins connected in one piece with the valve disk or with the housing of the step valve are suitable. Furthermore, bushings, sleeves or guiding rods may be positioned in the valve disk or the components surrounding the valve disk for use as guide elements. Alternative guide elements with suitable cross section profiles are furthermore suitable. The invention provides guide elements which secure a guide play which comes to ≦0.1 mm by means of which an exact guidance of the closing element can be obtained in connection with an effective suppression of noise.

The concept of the invention provides in addition for the closing element to lie on the sealing disk attaining a high degree of sealing in the blocking state, that is, sealing in the closed state. As a measure for suppression of noise and assuring optimal sealing, in accordance with the invention, the sealing seat or valve seat for the closing element is made of a plastic, especially a polymer material, so that even a closing element striking upon the sealing seat with a high closing velocity causes no disadvantageous noise excitation. As an alternative, a valve disk made of plastic can be used. As a supporting measure, the guide elements can be provided with a coating on the side directed toward the closing element, for example a PTFE coating, through which a steel on steel arrangement is avoided, which can have a disadvantageous effect on the noise level.

A defined leakage slit is allocated to the closing element in support of the digressive opening character. This leakage slit, which is advantageously positioned in a guide element, extends over the entire regulating displacement of the closing element. With this measure, flow resistance can be influenced advantageously in the opening phase. By dimensioning and/or geometrical configuring the leakage slit, which can be shaped as a function of temperature, viscosity or other in flow dimensions of the pressurized fluids, the course of the characteristic curve of flow-through resistance can be influenced.

The invention provides at least one lead-off cross section arranged on the closing element over which a pressure medium flow-through the step valve can take place after an axial displacement of the closing element. Introducing recesses at a distance in the wall of the guide element, for example, offers itself as a lead-off cross section, whereby the lead-off cross section can be constructed as a bore hole or as an elongated slot. In addition to the number, the profiling of the lead-off cross section can also be variably constructed. An axially graded arrangement of the lead-off cross sections toward one another is provided as an advantageous configuration for influencing the through flow resistance in the area of the greatest volume aperture in accordance with the invention. Alternatively, a helically running arrangement of the lead-off cross sections is also presented.

It is appropriate to arrange the lead-off cross section or even several lead-off cross sections such that a pressure medium flow can take place following a stroke of the closing element between 0.1 to 2 mm. Through this arrangement of the lead-off cross section, small amplitude fluctuations which occur very frequently in the hydraulic system can be compensated for.

As a further measure suppressing the excitation of noise by the closing element, the invention provides asymmetrically arranged guide elements as well as lead-off cross sections. For reaching a desired arrangement of the closing element on one or more guide elements in the opened state, the guide elements have cross sectional areas deviating from one another. This way, a directed current is advantageously set up which purposefully displaces the closing element in one direction.

A further configuration of the invention provides that the closing elements allotted to a flow direction in any given case have opening pressures deviating from each other. With this, a different opening characteristic between the two flow directions can be obtained when needed. For achieving deviating opening pressures, the compression springs allocated to the closing element can have different spring characteristic curves. Alternatively, varying the dimensioning of, for example, the valve surfaces acted upon for opening the closing element can be used for achieving divergent opening pressures.

The invention furthermore includes, as an alternative to a spring, using magnetic means for obtaining a degressive opening characteristic of the closing body. Permanent magnets which bring about a force-locking displacement of a closing element made of metal in the direction of the valve seat are suitable for this. The arrangement of the invention provides here that the force of the magnetic means stands in inverse proportion to the distance which is set up between the closing element and the magnetic means. By using magnetic means, the requirement of realizing a step valve optimized as to construction space can be better realized since this requires a smaller construction space in comparison to a compression spring.

The valve arrangement of the invention is suited for installation in a hydraulic system for a hydraulically actuated friction clutch in vehicles, which is subjected to the longitudinal vibrations of the internal combustion engine which are triggered by combustion strokes, and which bring about a bending strain of crank journal and crank arm of the crankshaft which are transmitted over the friction clutch to the hydraulic system and which lead to a disadvantageous crawling of the clutch pedal which impairs driving comfort.

As a further area of use for the valve element of the invention, it is appropriate for switchable, hydraulically activatable valve drive members for the activation of gas exchange valves in internal combustion machines. The opening characteristic realizable through the valve of the invention offers itself especially for use in pressure medium conduits for switching tamping tools, and hydraulic valve play compensation elements. Hydraulic clamping devices for tension medium drives as well as hydraulic steering aid systems are to be viewed as a further area of application of the valve element of the invention.

BRIEF DESCRIPTION OF THE SEVERAL VIEWS OF THE DRAWINGS

Three embodiments are described in detail below on the basis of six drawings, wherein.

DETAILED DESCRIPTION OF THE INVENTION

Figure 1:
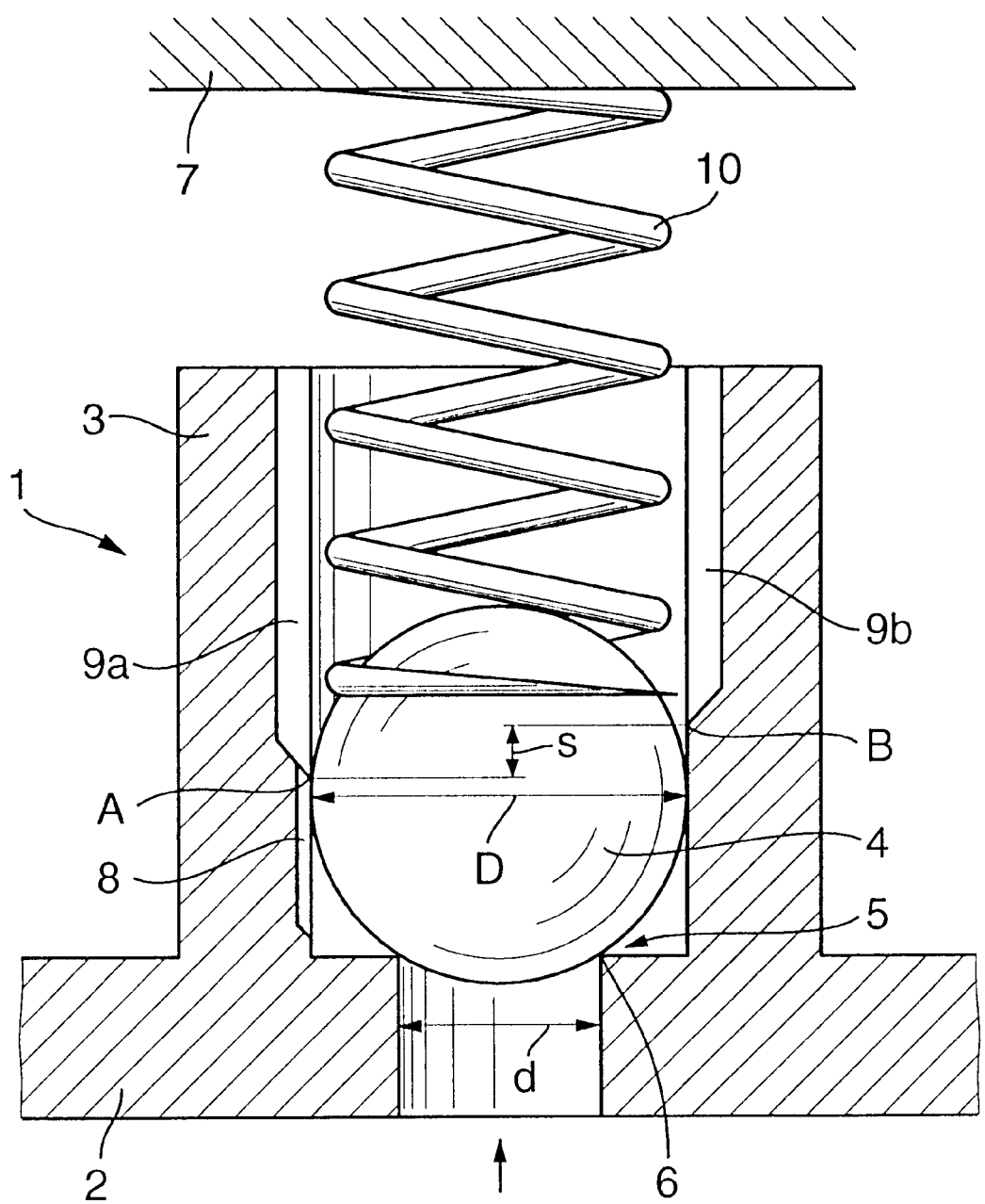
FIG. 1 is a cross-section of the principal structure of a step valve of the invention.

In FIG. 1, a valve element 1 is depicted in longitudinal section, which represents a one way valve constructed as a step valve 5 and a housing 2 which has guide elements 3 pointing in one direction which are joined in one piece with the housing 2 and which are radially arranged around a closing element 4. Here the closing element 4, which is acted upon by the force of a compression spring 10 which is mutually braced on a housing 7, lies on a valve seat 6 formed on the housing 2. The guide elements 3 form a closing element guide while maintaining a narrow guide play. To obtain a pressure medium current through the step valve 5, the pressure medium pressure acting upon the closing element 4 over the valve surface "d" displaces the closing element in the direction of the arrow. As soon as the closing element 4 is raised from the valve seat 6, the pressure medium acts upon valve surface "D," which corresponds to the equator, that is the largest diameter of the closing element 4. On the basis of the differences in area between the valve surfaces "d" and "D" and the use of a relatively weak compression spring 10, the flow resistance diminishes with the consequence that the opening speed of the closing element 4 increases. Immediately after raising the closing element 4 from the valve seat 6, a portion of the pressure medium can flow off through leakage slit 8. This leakage slit 8, which avoids disadvantageous strong pressure grades or transitions, is arranged in the form of a longitudinal groove in a guide element 3. Upon arriving at site "A" of closing element 4, that is when the equator area of closing element 4 passes beyond position "A," the pressure medium can flow off over a lead-off cross section 9a without pressure. With a further shift of the closing element 4 beyond site "B," an additional amount of pressure medium is drained off over lead-off cross section 9b. By changing the measure of difference "s" between sites "A" and "B," influence can be exerted on flow-through resistance. Instead of the two stage construction of the lead-off cross sections 9a, 9b in FIG. 1, the invention likewise provides an arrangement of the lead-off cross sections on the guide elements 3 constructed graded over their perimeter. A construction of the lead-off cross sections with a helical configuration can be provided alternatively.

Mode of Operation of the Valve Element

A pressure medium current which flows against valve element 1 over the valve surface "d" (see arrow) acts upon the closing element 4 depicted in FIG. 1. An axial movement of the closing element 4 can take place in the direction of the arrow if a force resulting from the product of the valve surface "d" and the pressure of the pressure medium is greater than the force of compression spring 10. With a movement of the closing element 4, which is provided with two valve surfaces "d" and "D" of different dimensions from each other, an accelerated movement of closing element 4 is set up after a movement, namely a lifting of closing element 4 from valve seat 6 owing to the larger valve surface "D" which can be acted upon by pressure medium. In connection with this, a portion of the pressure medium is led off over a leakage slit 8 arranged in a guide element 3. An increased pressure medium flow can take place through the step valve 5 as soon as the equator of the closing element 4 has reached site "A." The largest opening cross section results when the closing element 4 has passed site "B" and the pressure medium can flow off over lead-off cross section 9b.

In a further embodiment (FIG. 2 and FIG. 3) of a valve element 11 of the invention, components in accordance with the first embodiment are provided with numbers higher by 10, so that, concerning its description, reference can be made to the first embodiment (FIG. 1).

Figure 2:
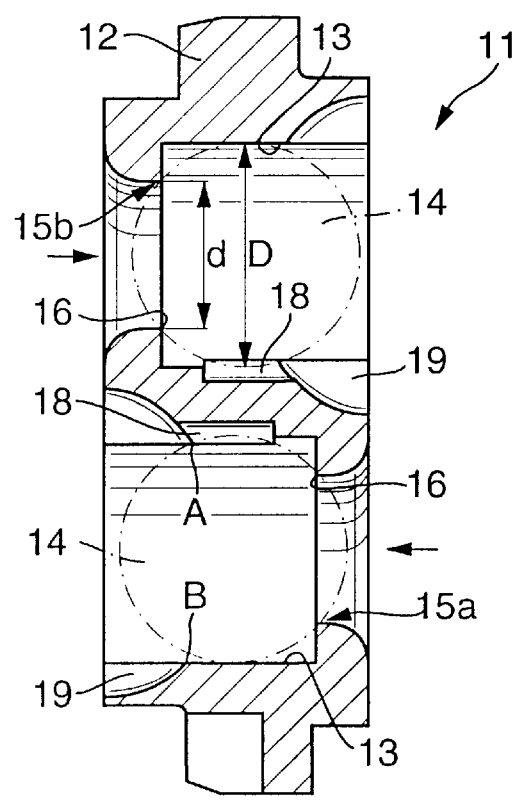
FIG. 2 shows a valve element in a longitudinal cross-section which includes two radially spaced step valves arranged at a distance from one another.

The valve element 11 depicted in FIG. 2 includes two step valves 15a, 15b arranged radially at a distance to each other positioned in a valve disk 12, whereby the valve disk 12 corresponds by its function to the housing 2 according to the embodiment in FIG. 1. The step valves 15a, 15b arranged in an alignment are allocated to one current direction in each case. The respective arrows indicate in which direction the closing elements 14 can be moved by hydraulic fluid to reach a pressure medium flow-through. For optimizing flow, valve disk 12 has on the in flow side of valve surface "d" rounded inlets as well as lead-off cross sections 19 which are in any given case constructed as spread radially outward beginning from site "A" or "B." As opposed to valve element 1 (in accordance with FIG. 1), the guide elements 13 are a component of valve disk 12 which are positioned by means of a boring into valve disk 12. From the front view of the valve element 11 (see FIG. 3), the arrangement of the lead-off cross sections 19 becomes clear which are in each case arranged circumferentially around the respective closing elements 14 in valve disk 12. This arrangement makes possible a circular axial grading of the sites "A" by means of which an almost continuous enlargement of the sum of lead-off cross sections is set up.

Figure 4:
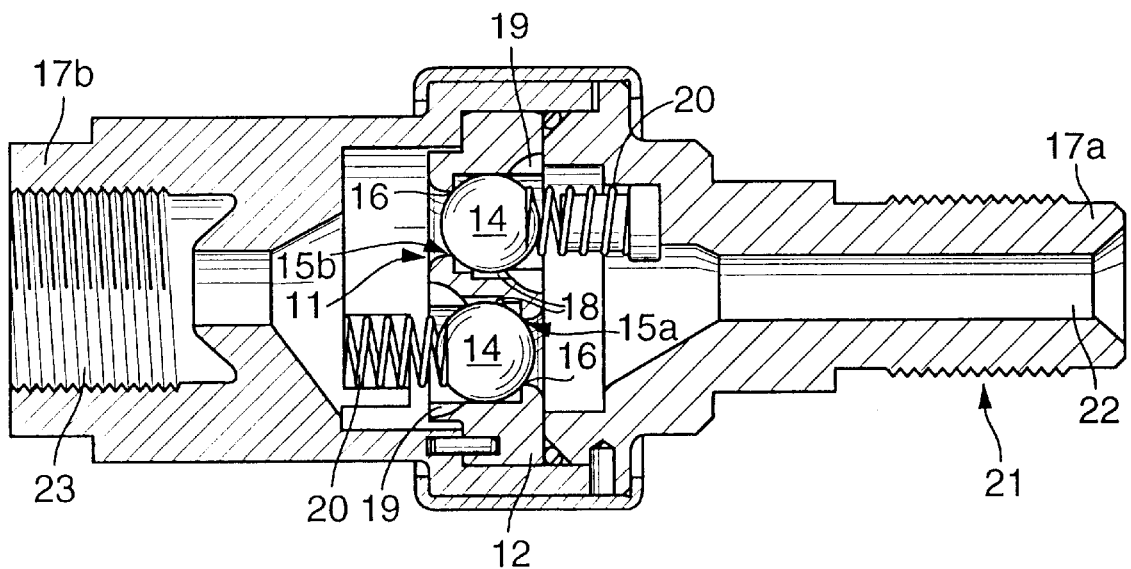
FIG. 4 shows the valve element in accordance with FIG. 2 inserted between two housings to create a damping element.

FIG. 4 depicts a damping element 21 which can be used as a "crawl filter" for hydraulic operation of a friction clutch of vehicles, and which includes two housings 17a, 17b which have a connection 22 or 23, whereby between housings 17a, 17b the valve element 11 in accordance with FIG. 2 is inserted. To create a unitary assembly, the housings 17a, 17b are surrounded in a middle region by a bushing which is provided with a radially inwardly extending flange on both faces.

Figure 5:
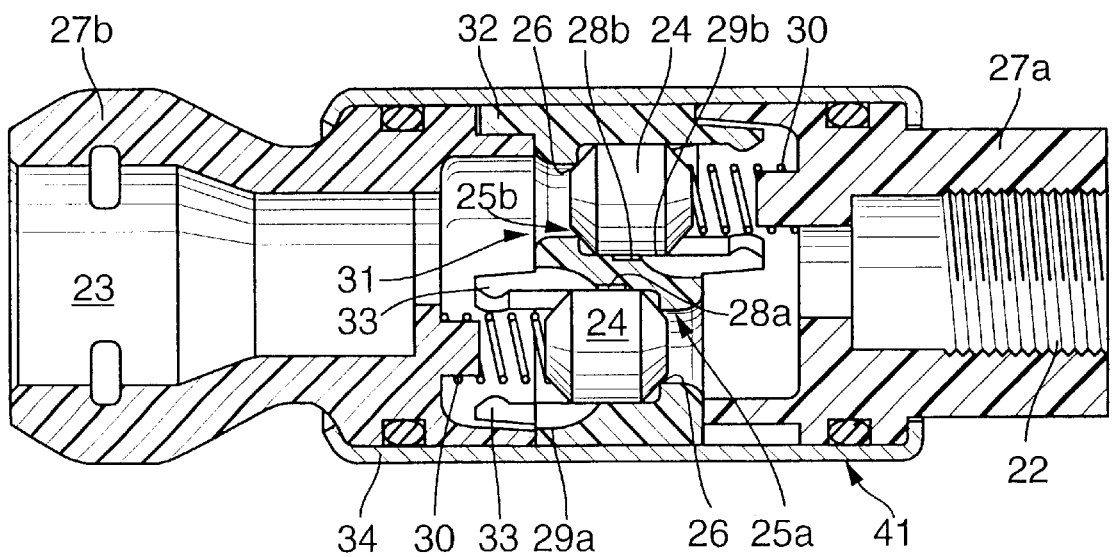
FIG. 5 shows an alternatively configured damping element to that shown in FIG. 4, with cylindrically constructed closing elements.

In comparison with FIG. 4, an alternatively constructed damping element 41 is to be understood from FIG. 5 which provides closing elements 24 in a cylindrical type of construction which are installed in the valve disk 32 radially spaced at a distance from each other. On both faces, the closing elements 24 have truncated cone-like transitions, which on the one side lies on valve seat 26 in the closed state of the valve element 31 and in relation to which a compression spring 30 is reciprocally centered. The construction of the valve element 31 provides for a valve disk 32 made of plastic in which the lead-off cross sections 29a, 29b are located, and a leakage slit 28a, 28b is assigned to each closing element 24. Retention fingers formed as one piece with the valve disk 32 project axially out of the valve disk 32 to serve as guide elements 33. These guide elements 33 are arranged at a distance to one another around the closing element 24 to guarantee an exact guidance of the closing element 24 which form the step valves 25a, 25b. The damping element 41 furthermore includes the housings 27a, 27b located on both sides of the valve disk 32 which are surrounded by a sleeve 34 to create a unitary assembly, and on the end faces is joined in a form-locking manner with the housing 27a, 27b.

Figure 6:
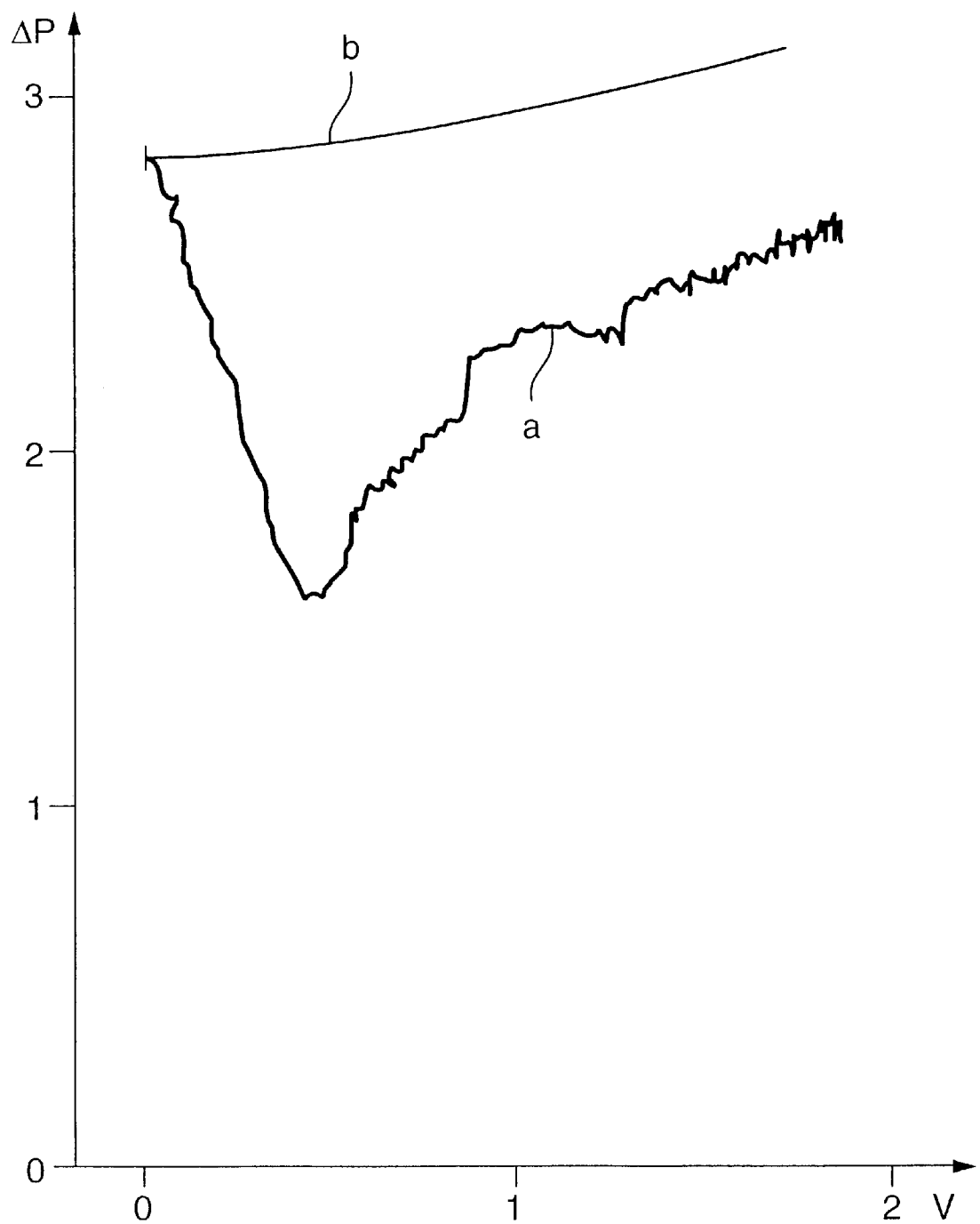
FIG. 6 is a diagram of the characteristic curve of the flow-through resistance of the step valve of the invention in comparison with a conventional one way valve.

FIG. 6 clarifies in a diagram the course of flow-through resistance of the step valve 5 or 15a, 15b of the invention in comparison with a conventionally constructed ball valve in a one way valve construction. Here the flow-through resistance "$\Delta P$" is entered on the ordinate and the volume flow "V" on the abscissa. The curve plot "a" represents the step valve 5 or 15a, 15b and manifests a strongly degressive course, that is, the pressure necessary to open closing element 4, 14 is clearly higher than the pressure which arises in the opened state in connection with relatively low flow-through volumes. A rise in pressure takes place as a function of the flow-through volume. In contrast to this, the curve plot "b" shows the flow-through resistance for a conventionally constructed one way valve with a closing body in the form of a ball in connection with which flow-through resistance rises as soon as the one way valve begins to open.

Figure 3:
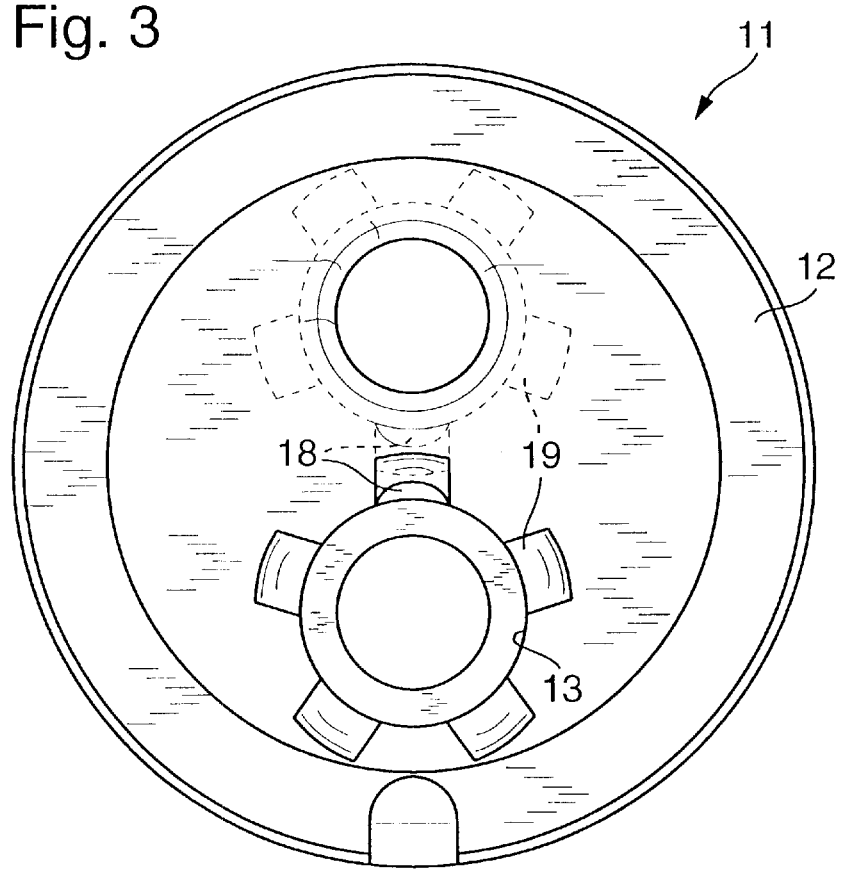
FIG. 3 shows a front view of the valve element in accordance with FIG. 2.
Figure 7:
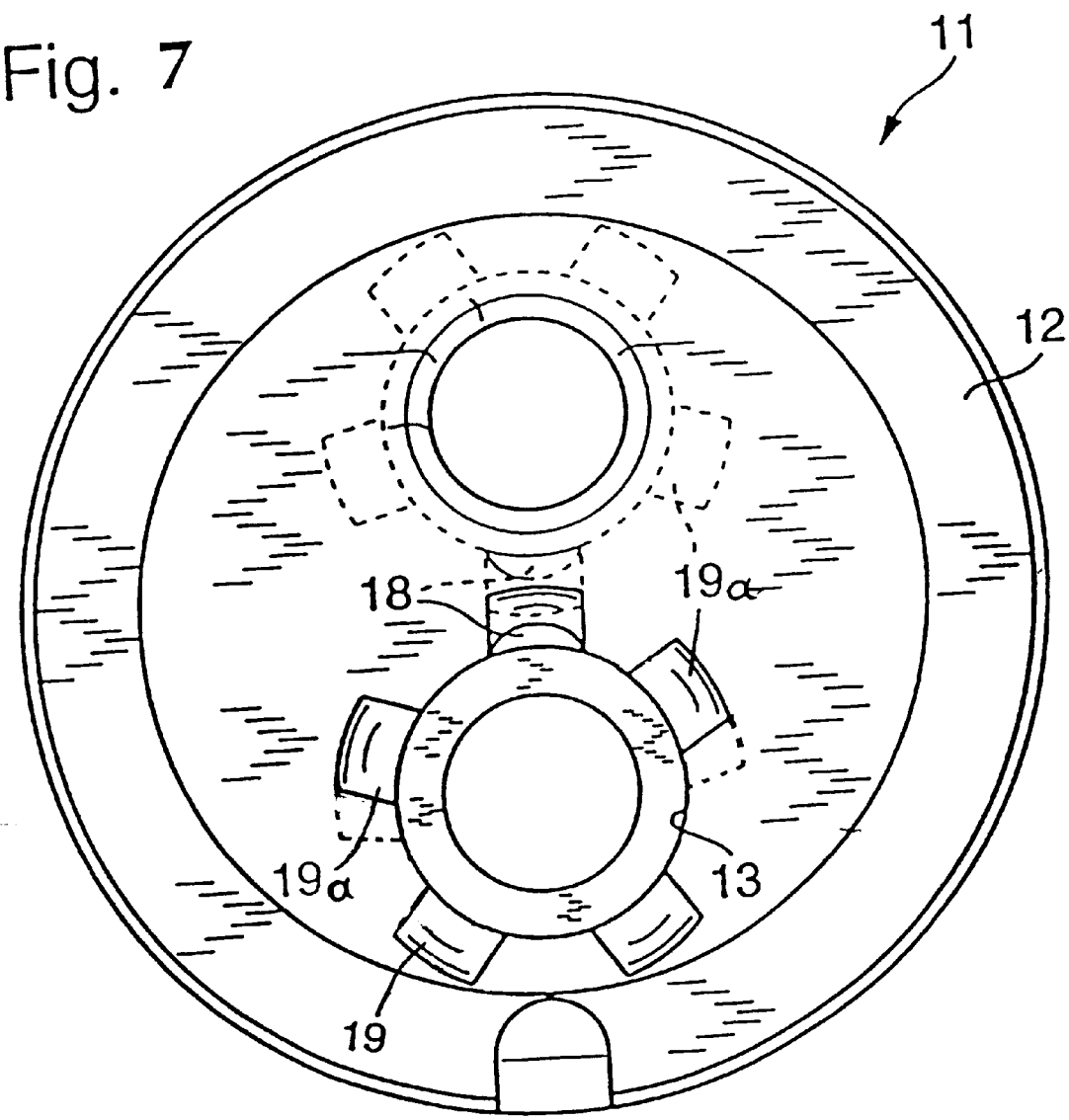
FIG. 7 shows a valve element similar to FIG. 3 with an alternate arrangement of the lead-off cross sections of the step valves.

FIG. 7 shows a front view of the valve element 11, similar to FIG. 3, which differs in that the lead-off cross sections deviate from the arrangement shown in FIG. 3. Each through flow cross section of the valve disk 12 is provided with two lead-off cross sections 19a which are spaced apart from one another, in which the axial distance to the valve seat 16 (shown in FIG. 2) changes in helical form, as indicated by the dashed lines. Additional straight sided lead-off cross sections 19 are also included in the valve disk 12. Based on an asymmetrical arrangement of the lead-off cross sections 19, 19a, guide elements 13 which have cross sectional areas which deviate from one another are provided.

Reference Designations

1 Valve element
2 Housing
3 Guide element
4 Closing element
5 Step valve
6 Valve seat
7 Housing
8 Leakage slit
9a Lead-off cross section
9b Lead-off cross section
10 Compression spring
11 Valve element
12 Valve disk
13 Guide element
14 Closing element
15a Step valve
15b Step valve
16 Valve seat
17a Housing
17b Housing
18 Leakage slit
19 Lead-off cross section
20 Compression spring
21 Damping element
22 Connection
23 Connection
24 Closing element
25a Step valve
25b Step valve
26 Valve seat
27a Housing
27b Housing
28a Leakage slit
28b Leakage slit
29a Lead-off cross section
29b lead-off cross section
30 Compression spring
31 Valve element
32 Valve disk
33 Guide elements
34 Sleeve
41 Damping element

We claim:

1. Valve arrangement for a hydraulic system, constructed as a step valve (15a, 15b; 25a, 25b), comprising a housing (17a, 17b; 27a, 27b) that is provided with connections (22, 23) and is provided with a valve element (11, 31) that has two spaced apart step valves (15a, 15b; 25a, 24b), each associated with a flow direction, each step valve being provided with a valve seat (16, 26) and a spring actuated closing element (14, 24), whereby the closing element (4, 14, 24) has a first valve surface (d) in a closed position which is smaller than a second valve surface (D), which appears in a displaced position of the closing element from the valve seat (6, 16, 26), the two step valves (15a, 15b; 25a, 25b) are provided with the valve seats (16, 26) which are radially spaced apart in a valve disk (12, 32) and include leakage slits (8, 18, 28) arranged along the same axial displacement of the closing elements (4, 14, 24), and the valve disk (12, 32) includes guide elements (13, 33) arranged circumferentially about sides of the closing elements (14, 24) for guiding the closing elements (14, 24), whereby for actuating the closing element (14, 24) a compression spring (10, 20, 30) is provided having approximately equal spring force between an open and a closed position of the closing elements (14, 14, 24) to obtain a degressive opening characteristic for the step valves (15a, 15b; 25a, 25b).

2. Valve arrangement according to claim 1, wherein one of a rotationly-symmetrical component and a ball is provided as the closing element.

3. Valve arrangement according to claim 1, wherein the closing element is a rotationly-symmetrical closing element (24) in a cylindrical form which has a truncated cone portion on both faces.

4. Valve arrangement according to claim 1, characterized in that the valve surface (D) corresponds to 1.2 to 5 times the value of valve surface (d).

5. Valve arrangement according to claim 1, wherein the valve disk (12, 32) has a bushing or casing extending in an opening direction of the closing element (14, 24).

6. Valve arrangement according to claim 1, wherein pegs are provided for guiding the closing element (14, 24) which are positioned in or are joined in one piece with the valve disk (12, 32).

7. Valve arrangement according to claim 1, wherein the valve disk (12, 32) or a component surrounding the valve disk (12, 32) has pegs which form the guide elements (13, 33) for the closing element (14, 24).

8. Valve arrangement according to claim 1, wherein a measure for a guide play between the closing element (4, 14, 24) and the guide element (3, 13, 33) is $\leq 0.1$ mm.

9. Valve arrangement according to claim 1, wherein at least one of the valve disk (12, 32) and the valve seat (6, 16) is made of a plastic or polymer material.

10. Valve arrangement according to claim 1, wherein the leakage slit (8,18, 28) one of a half round, triangular or rectangular shaped contour.

11. Valve arrangement according to claim 1, wherein at least one lead-off cross section (9a, 9b; 19; 29a, 29b) is associated with the closing element (4, 14, 24), over which a pressure medium flow through the step valve (5, 15a, 15b, 25a, 25b) takes place following an axial movement of the closing element (4, 14, 24).

12. Valve arrangement according to claim 11, wherein there are at least two lead-off cross sections (9a, 9b; 19; 29a, 29b) which are configured axially graded in relation to each other.

13. Valve arrangement according to claim 11, wherein there are at least two peripherally arranged lead-off cross sections (19a), whose axial distance to the valve seat (6, 16) changes in helix form.

14. Valve arrangement according to claim 11, wherein an axial distance of the lead-off cross sections to the valve seat (6, 16, 26) is provided which requires an axial movement of the closing element (4, 14, 24) from 0.1 to 2.0 mm to obtain a pressure medium flow.

15. Valve arrangement according to claim 11, wherein the guide elements (13) and the lead-off cross sections (19) are arranged asymmetrically and or have cross-sectional areas deviating from one another to arrive at a desired arrangement of one or more guide elements (13) for the closing element (14) in an opened state.

16. Valve arrangement according to claim 1, wherein a step valve (15a, 15b, 25a, 25b) in connection with which the closing elements (14, 24) are assigned to a flow direction have opening pressures which differ from one another.

17. Valve arrangement according to claim 1, wherein the valve element (11, 31) is used in hydraulically actuated friction clutches of motor vehicles.

18. Valve arrangement according to claim 1, wherein the valve element (11, 31) is inserted in hydraulically shiftable valve drive members for activation of gas exchange valves in internal combustion machines.

19. Valve arrangement according to claim 1, wherein the valve element (11, 31) is arranged in a tension medium clamping device which can be hydraulically activated.

20. Valve arrangement according to claim 1, wherein the valve element (11, 31) is connected in a hydraulically actuated steering auxiliary system for vehicles.

* * * * *